(12) United States Patent
Grutter

(10) Patent No.: US 7,082,144 B1
(45) Date of Patent: Jul. 25, 2006

(54) COMMUNICATION SYSTEM USING A MULTIPLEX SIGNAL CARRYING AN AUXILIARY SIGNAL

(75) Inventor: Hendrikus J. Grutter, Hilversum (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/431,581

(22) Filed: Nov. 1, 1999

(30) Foreign Application Priority Data

Nov. 2, 1998 (EP) .................................. 98203689

(51) Int. Cl.
*H04J 3/04* (2006.01)

(52) U.S. Cl. ...................... 370/535; 370/538; 370/543

(58) Field of Classification Search ........ 370/535–538, 370/470, 540, 542, 522, 527, 528, 543, 544, 370/545

See application file for complete search history.

(56) References Cited

U.S. PATENT DOCUMENTS

| | | | | |
|---|---|---|---|---|
| 4,727,536 A | * | 2/1988 | Reeves et al. | 370/468 |
| 4,860,282 A | * | 8/1989 | Itoh et al. | 370/501 |
| 5,121,205 A | * | 6/1992 | Ng et al. | 348/568 |
| 5,682,386 A | * | 10/1997 | Arimilli et al. | 370/468 |
| 5,757,801 A | | 5/1998 | Arimilli | 370/444 |
| 5,920,572 A | * | 7/1999 | Washington et al. | 370/535 |
| 6,052,384 A | * | 4/2000 | Huang et al. | 370/468 |
| 6,233,251 B1 | * | 5/2001 | Kurobe et al. | 370/471 |
| 6,275,502 B1 | * | 8/2001 | Arimilli | 370/468 |
| 6,331,989 B1 | * | 12/2001 | Tezuka | 370/335 |
| 6,529,528 B1 | * | 3/2003 | Park et al. | 370/535 |

FOREIGN PATENT DOCUMENTS

WO   WO9816083   4/1998

* cited by examiner

*Primary Examiner*—Ajit Patel

(57) ABSTRACT

In a transmitting node (3) in a transmission system, a plurality of source signals are multiplexed by a multiplexer (34) into a multiplex signal. The multiplex signal is transmitted to a receiving node (5) where it is demultiplexed in the source signals. The multiplex signal comprises a plurality of packets having a flag field, a length field, a connection ID field and a data field. The flag field can be present to enable the receiver to find the beginning of the packet or to carry non-urgent control signals. According to the present invention, the length of the flag field is dependent on the aggregate bitrate of the source signals, making it possible that more source signals can be transmitted over the transmission link under heavy traffic conditions.

11 Claims, 4 Drawing Sheets

COMMUNICATION SYSTEM USING A MULTIPLEX SIGNAL CARRYING AN AUXILIARY SIGNAL

BACKGROUND OF THE INVENTIONS

The present invention relates to a communication system comprising a first node having a multiplexer for multiplexing a plurality of source signals into a multiplex signal, the first node comprises transmission means for transmitting the multiplex signal to a second node, the second node comprises a demultiplexer for demultiplexing the multiplex signal into said source signals.

A communication system according to the preamble is known from International Patent Application published under No. WO 98/16083.

In the past networked PBX's have been introduced, in which a plurality of PBX's are interconnected via a communication link in order to obtain a larger virtual switch. The PBX's can be at different locations, which can be in different cities and even in different countries. The communication link often comprises a connection over a public telephone network (PSTN).

A substantial part of the operational costs of the network of interconnected PBX's is constituted by the costs of the interconnections between the PBX's charged by the operator of the public telephone network. This makes it important to use the connections as efficient as possible. The multiplex signal often carries a plurality of source signals and some auxiliary signal.

SUMMARY OF THE INVENTION

The object of the present invention is to provide a communication system according to the preamble in which the number of source signal that can be transmitted over the connection is increased.

To achieve said object, the communication system according to the preamble is characterized in that the multiplexer is arranged for introducing a variable length auxiliary signal into the multiplex signal, the length of the variable length auxiliary signal being dependent on an aggregate rate of the source signals to be transmitted.

By making the length of the field carrying the auxiliary signal dependent on the aggregate rate of the source signals to be transmitted, it becomes possible to create more space for transmitting source signals during periods when it is needed. This can easily be done when the auxiliary signal is a signal having no high priority of transmission.

An embodiment of the invention is characterized in that the auxiliary signal comprises a predetermines symbol sequence.

A predetermined symbol sequence is used to obtain synchronization at start up of the communication system, and for regularly checking whether synchronization is still present. If the auxiliary signal is a predetermined symbol sequence, the auxiliary signal can have its full length at start up of a connection, because then no source signals are carried yet. If more source signals are added, the length of the word synchronization signal can be decreased in order to free space for transmitting the additional source signals.

A further embodiment of the invention is characterized in that the multiplexer is arranged for multiplexing the source signals into packets; and for introducing the auxiliary signal into said packets, and in that the demultiplexer is arranged for extracting said packets from the multiplex signal, and for extracting said auxiliary signal from said packets.

By transmitting the source signal in packets, it becomes easy to deal with source signals having different bitrates.

A still further embodiment of the invention is characterized in that the multiplexer is arranged for introducing a length field into the packet indicating the length of a source signal field in the packet, and in that the demultiplexer is arranged for extracting the source signal field using the length carried by the length field.

By using a length field in the packet, it is possible to carry to carry source signals with a different bitrate in an efficient way, without the need to keep in the receiver an administration of the length for all packets.

A still further embodiment of the invention is characterized in that the length field can alternatively comprise a first number of symbols indicating a fixed length of the source signal field or a second number of symbols larger than the first number carrying a length value indicating the length of a variable length of the source field.

This measure leads to a more efficient transmission of the length field. If the data field has a predetermined length, the first number of symbols are set to a corresponding value. This can e.g. be done by setting a single bit to a value of "1". If the data field has a length different from the predetermined length, the first number of symbols are set to a different value. In the example of the single bit, this bit can be set to "0" when the length of the data field differs from the predetermined length. After said bit, a number of symbols follow which indicate the actual length of the data field.

If data field often have the predetermined length, the average number of bits of the length field is then only slightly larger than one bit.

BRIEF DESCRIPTION OF THE DRAWING

The present invention will now be explained with reference to the drawings.

DESCRIPTION OF THE PREFERRED EMBODIMENTS

Figure 1:
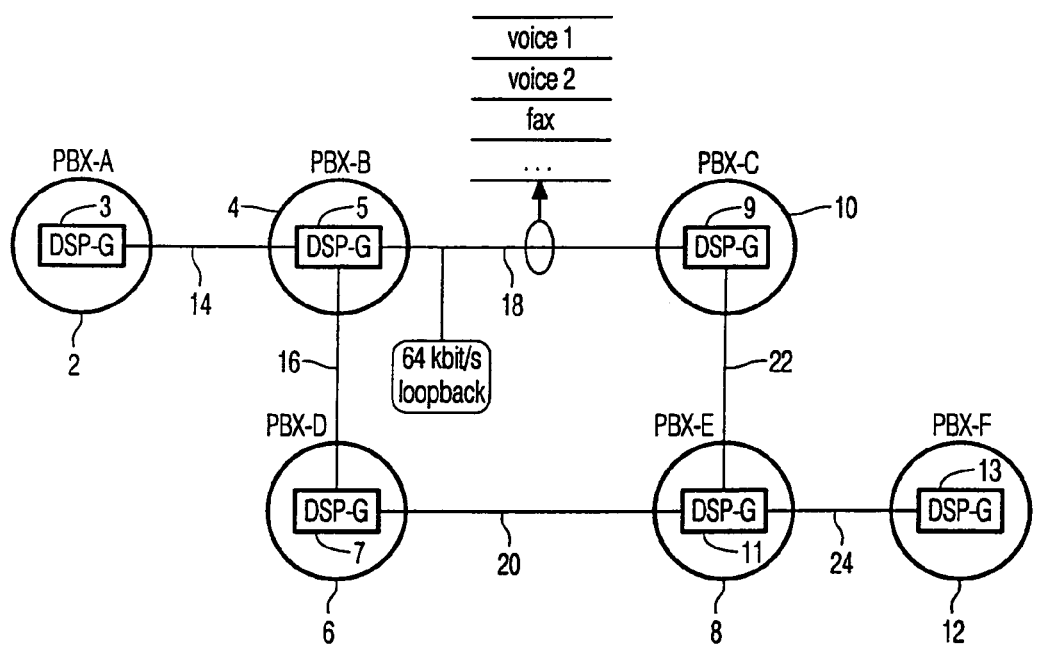
FIG. 1 shows a communication system comprising a plurality of networked PBX's.

The communication system according to FIG. 1 comprises a plurality of PBX's 2, 4, 6, 8, 10 and 12. The respective PBX's 2, 4, 6, 8, 10 and 12 comprise a compression server 3, 5, 7, 9, 11 and 13. The PBX's are interconnected via 64 kbit/sec channels 14, 16, 18, 20, 22 and 24. The compression servers can compress speech signals to be transmitted according to several compression algorithms, such as G.728, G.729. They also comprise compression algorithms dedicated for fax signals according to several standards such as V.17, V.29 and V.21 and modem signals according to several standards such as V.34, V.32 and V.22.

Each of the channels is able to carry a plurality of compressed voice and data signals. The setup according to FIG. 1 is extensively used to reduce the costs of the channels

14, 16, 18, 20, 22 and 24 which are generally routed via a public telephone network. Without using compressions, the required capacity of the channels between the PBX's should have been substantially larger than presently is the case.

According to the inventive idea of the present invention, the compression ratio, and consequently the number of source signals is increased in dependence on the required amount of traffic between two interconnected PBX's. This results in a substantial increase of the capacity of the channel, at the cost of a small deterioration of the transmission quality under heavy traffic conditions.

Figure 2:
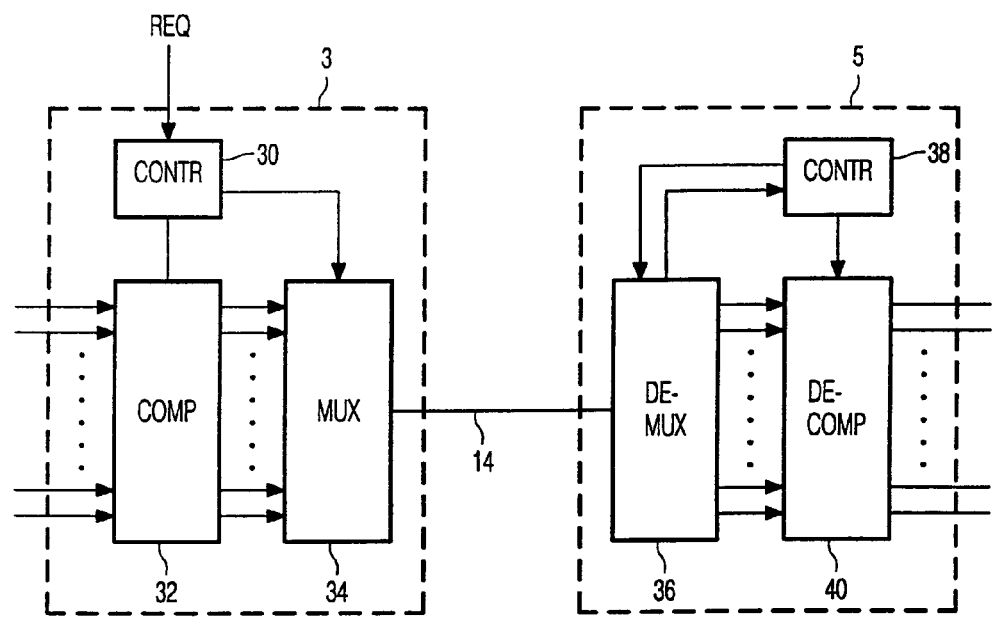
FIG. 2 shows a block diagram of a transmission system according to the invention.

FIG. 2 shows the compression servers 3 and 5 interconnected via the transmission link 14 in more detail. A plurality of source signals is applied to corresponding inputs of a compression processor 32. The compression method to be used for each of the active input signals of the compression processor is determined by a controller 30. The controller 30 receives from the switching core of the PBX a signal for requesting new connections or requesting the release of existing connections.

In the following it will be assumed that three possible compression methods can be used for voice transmission i.e. G.728 (16 kbit/s), G.729 (8 kbit/s) and a sinusoidal coder called Harmony (4 kbit/s). G.728 and G.729 will be well known for those skilled in the art. It is further assumed that at least 8 kbit/sec are needed for exchanging signaling information between the interconnected compression servers 3 and 5.

In the table below, the number of channels using each of the compression methods is given as function of the total number of requested connections.

| # requested ch. | # G.728 ch. | # G.729 ch. | # Harmony ch. | Total Bitrate |
|---|---|---|---|---|
| 1 | 1 | 0 | 0 | 16 kbit/s |
| 2 | 2 | 0 | 0 | 32 kbit/s |
| 3 | 3 | 0 | 0 | 48 kbit/s |
| 4 | 2 | 2 | 0 | 48 kbit/s |
| 5 | 2 | 3 | 0 | 56 kbit/s |
| 6 | 1 | 5 | 0 | 56 kbit/s |
| 7 | 0 | 7 | 0 | 56 kbit/s |
| 8 | 0 | 6 | 2 | 56 kbit/s |
| 9 | 0 | 5 | 4 | 56 kbit/s |
| 10 | 0 | 4 | 6 | 56 kbit/s |
| 11 | 0 | 3 | 8 | 56 kbit/s |
| 12 | 0 | 2 | 10 | 56 kbit/s |
| 13 | 0 | 1 | 12 | 56 kbit/s |
| 14 | 0 | 0 | 14 | 56 kbit/s |

The compressed signals at the output of the compression processor 32 are applied to corresponding inputs of a multiplexer 34. The multiplexer 34 assembles a frame comprising the output signals from the compression processor 32 and signaling information from the controller 30. Because the bitrate of each of the output signals from the compression processor can vary, a flexible frame structure has to be used.

The output signal of the multiplexer 36 is transmitted via the channel 14 to an input of a demultiplexer 36 in the compression server 5. The demultiplexer 36 is arranged for demultiplexing its input signal into the compressed source signals and a control signal. The compressed source signals are applied to a decompression processor 40 and the control signal is applied to a controller 30.

The decompression processor 40 decompresses its input signal according to the appropriate decompression algorithm as indicated by a selection signal provided by the controller 38. The decompression algorithm to be used for each of the channels is derived by the controller 38 from the control signal received from the multiplexer 36. The controller 38 issues also a frame selection signal to the demultiplexer 36, indicating a change in the constitution of the frame received from the channel 14.

The decompressed signals are provided to the switching core of the PBX for routing to the final destination.

Figure 3:
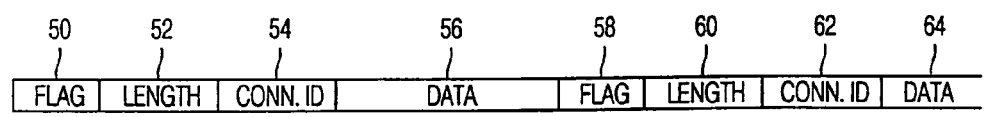
FIG. 3 shows a frame structure used to carry a multiplex signal used in the transmission system according to the invention.

The frame structure according to FIG. 3 comprises a continuous stream of packets, some of them being assigned to a connection. The packet starts with a flag field 50, 58, which carries a synchronization sequence. The synchronization sequence can be used for determining the beginning of a new packet. According to an aspect of the present invention, the length of the flag field 50, 58 is variable and can even be zero. This length can be made dependent on total required bandwidth on the transmission link. The length of the flag field is determined by use of a table of which Table 2 is an example.

TABLE 2

| Entry | Length of flag field |
|---|---|
| 1, 2 | 8 bits |
| 3, 4 | 4 bits |
| >4 | 0 bits |

The flag field 50, 58 is followed by a length field 52, 60 indicating the number of bits carried by the data field 56, 64 in the packet. If the first bit of the length field 52, 60 is equal to "0", the data field 56, 64 has a predefined length. In said case, the length field 52, 60 only consists of one bit with value "0". If the first bit of the length field is equal to "1", the length of the data field 56, 64 is described by the n next bits in the length field 52, 60.

After the length field 52, 60, the connection ID field 54, 62 is transmitted. The connection ID field 54, 62 identifies the connection to which the data in the data field 56, 64 belongs. One connection ID is reserved for peer to peer communication between the controllers 30 and 38 in order to be able to exchange control information between them. Finally the data field 56, 64 is transmitted which carries the compressed source signals. The length field 52, 60 indicates the length of the data field 56, 64.

Figure 4:
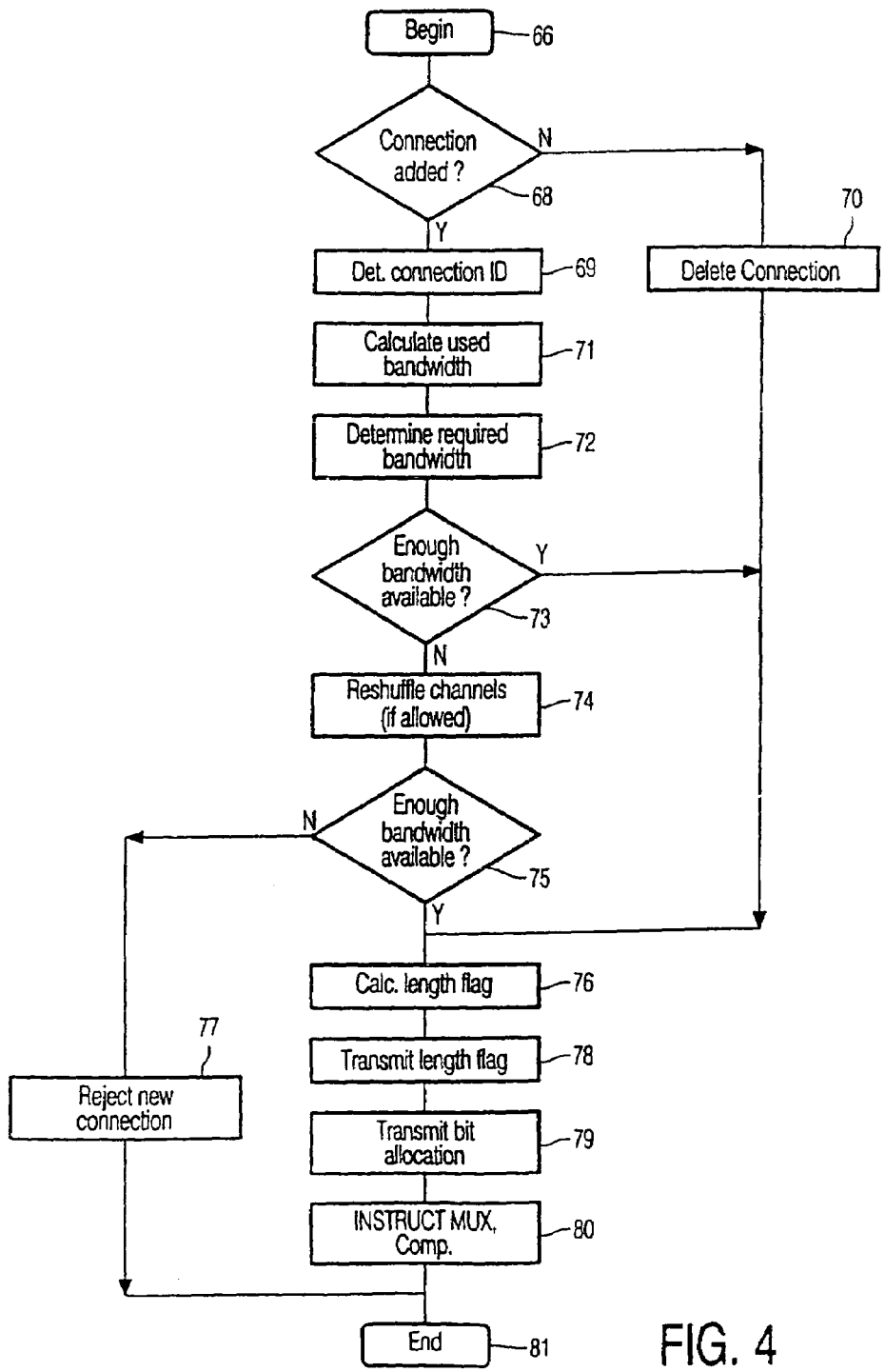
FIG. 4 shows a flowgraph of a program for a programmable processor to implement the controller 30 used in the compression server 3 in the system according to FIG. 1.

In the flowgraph according to FIG. 4, the numbered items have the following meaning:

| No | Inscription | Meaning |
|---|---|---|
| 66 | BEGIN | Begin of the program |
| 68 | CONNECTION ADDED? | It is determined whether a new connection is to be added. |
| 69 | DET. CONN. ID | The connection ID of the new connection is determined. |
| 70 | DELETE CONNECTION | The superfluous connection is deleted. |
| 71 | CALCULATE USED BANDWIDTH | The total bandwidth of all the channels is calculated |
| 72 | CALC BITRATE | The aggregate bitrate of all the connections is calculated. |
| 73 | ENOUGH BANDWIDTH? | It is checked whether there is sufficient bandwidth available for a new connection |
| 74 | RESHUFFLE CHANNELS | Assign different bandwidth to the active channels. |
| 75 | ENOUGH BANDWIDTH? | It is checked whether there is sufficient bandwidth available for a new connection |

-continued

| No | Inscription | Meaning |
|---|---|---|
| 76 | CALC LENGTH FLAG | The length of the flag field is determined. |
| 77 | REJECT NEW CONNECTION | A requested new connection is rejected. |
| 78 | TRANSMIT LENGTH FLAG | The length of the flag field is transmitted. |
| 79 | TRANSMIT BIT ALLOCATION | The new bit allocation is transmitted. |
| 80 | INSTRUCT MUX, COMP. | The compression processor and the multiplexer are informed about the new bit allocation. |
| 81 | END | The program is terminated. |

The program according to the flowgraph of FIG. 4, is started when one or more new connections have to be added or deleted from the multiplex signal transmitted between two PBX's. This is done in response to a signal from the switching core of the PBX indicating that a new connection between two PBX has to be set up, or that an existing connection between the PBX's has to be closed. In instruction 66 of the program according to FIG. 4 an initialization takes place.

In instruction 68 it is checked whether there has a connection to be added or to be deleted from the multiplex to be transmitted.

If one or more connections have to be added, in instruction 69 a connection ID is assigned to these connections, and an input of the compression processor 32 is assigned to said connection ID. In instruction 71 the aggregate bitrate of the presently active channels are calculated by adding the individual bitrates.

If one or more connections have to be deleted, in instruction 70 the inputs of the compression processor 32 corresponding to said ID's is freed, and the compressed source signals with a connection ID corresponding to the connections to be deleted are removed from the multiplex.

In instruction 72 the bandwidth required for the new connection to be added is determined. If no restrictions are imposed on the Quality of Service the bitrate for a voice signal can be 4, 8 or 16 kbit/s. Normally the bitrate for the connection to be added will be selected to be equal to the lowest bitrate presently used on the multiplex. If certain Quality of Service demands are associated with the new connection to be set up, the required bitrate is selected according to said Quality of Service.

In instruction 73 it is checked whether the available bandwidth allows the addition of the new connection. If sufficient bandwidth is available, the program is continued at instruction 74. If insufficient bandwidth is available, the bandwidth available for existing connections will be lowered to make bandwidth available for the new call to be added. However in doing this account is taken of Quality of Service requirements. The bitrate of existing connections having certain Quality of Service requirements are not decreased. The amount of channels of which the bitrate has to be reduced is determined from the required bitrate needed for the channel to be added. If e.g. the newly to be added channel requires 4 kbit/sec, the bitrate of an existing 8 kbit/sec channel is reduced to 4 kbit/sec. and the freed 4 kbit/sec. are used for the newly added channel.

In instruction 75 it is checked whether after the reshuffling operation there is sufficient bandwidth available for adding the new channel. If this is not the case, in instruction 77 the new connection is rejected, and the switching core of the PBX should use an alternative connection, such as a dial up connection over the public telephone network. If sufficient bandwidth is available for the new connection to be added, in instruction the length of the flag field in dependence on the aggregate bitrate calculated in instruction 76. If the aggregate bitrate is below a threshold value, the flag field has a nominal value. If the aggregate bitrate is above said value, the length of the flag field is decreased. It is possible that the length of the flag field is reduced to zero, effectively making it non-existent.

In instruction 78 the flag length is transmitted, and in instruction 79 the bit allocation is transmitted. These data are transmitted in a packet with a connection ID corresponding to the connection ID reserved for peer to peer communication between the controllers 30 and 38.

In instruction 80 the compression processor 32 and the multiplexer 34 are informed about the changes they should make in their operation. The compression processor 32 should be informed about the compression scheme to be used for each of its channels. The multiplexer 34 should be informed about the packet format to be used for each output signal from the compression processor 32 and the connection ID to be assigned to said output signal.

Finally the program is terminated in instruction 81.

| No. | Inscription | Meaning |
|---|---|---|
| 86 | BEGIN | Begin of the program |
| 88 | NEW CONNECTION? | It is determined if a new connection has to be added. |
| 90 | ADD NEW CONNECTION | A new connection is added. |
| 92 | DELETE CONNECTION | An existing connection is deleted. |
| 94 | READ LENGTH FLAG | The length of the flag field is read. |
| 96 | READ BIT ALLOCATION | The bit allocation to the several channels is read. |
| 98 | INSTRUCT DEMUX, DEC | The demultiplexer 36 and the decompressor 40 are instructed. |
| 100 | END | The program is terminated |

Figure 5:
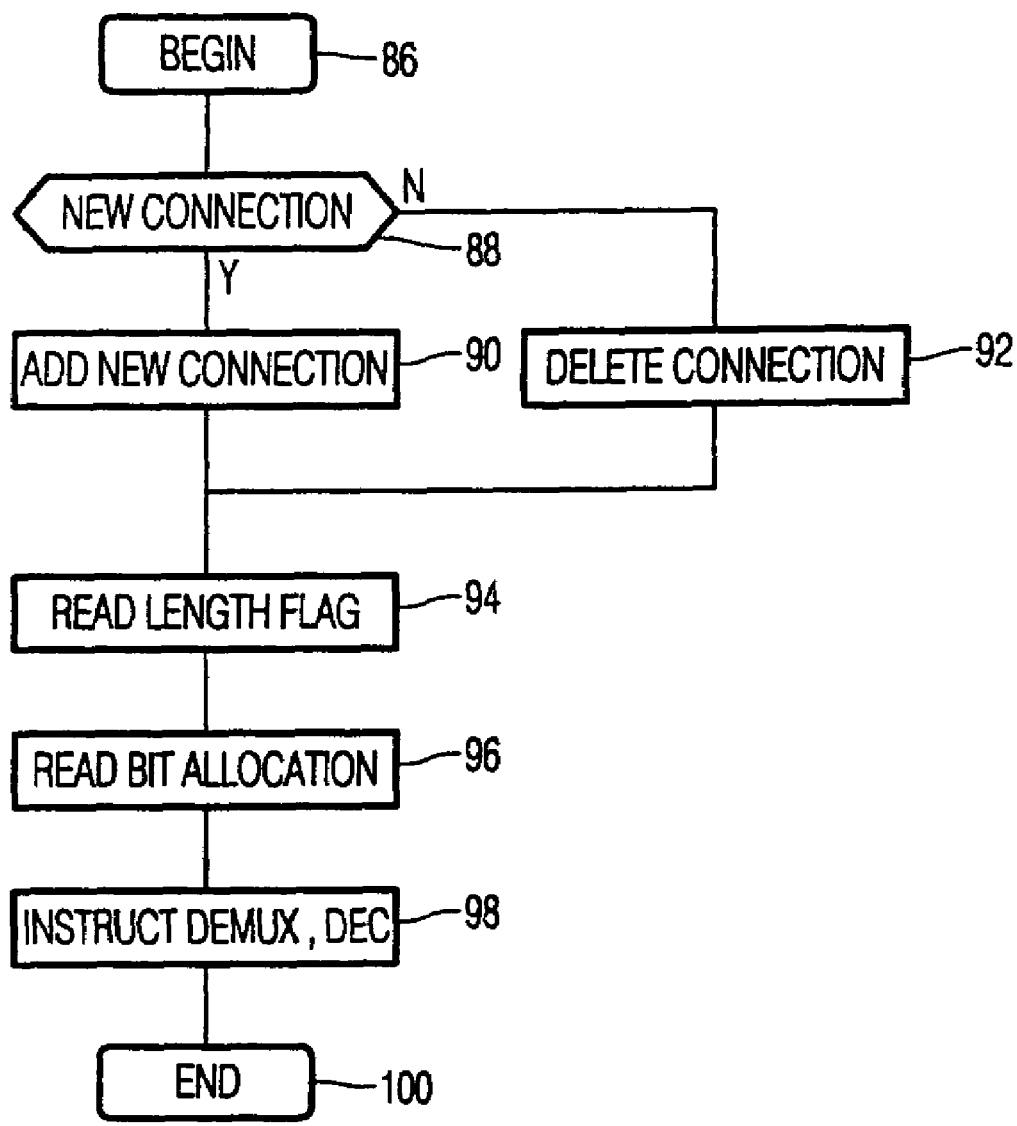
FIG. 5 shows a flowgraph of a program for a programmable processor to implement the controller 38 used in the compression server 5 in the system according to FIG. 1.

It is assumed that the program according to FIG. 5 is started when the controller 38 receives via the demultiplexer 36 a signal from the controller 30 that a change of the channel assignment takes place.

The program starts with instruction 86 in which an initialization takes place. In instruction 88 it is checked whether a connection has to be added of that a connection has to be deleted. If a connection has to be added, in instruction 90 the necessary measures are taken. This involves storing the connection ID of the new connection to be added, and the updating of a connection table corresponding to Table 3 used in the transmitter. Furthermore, the assignment of a received signal to an input of the decompression processor 36 has to take place. If a connection has to be deleted, the connection is removed from the connection table.

In instruction 94 the length of the flag field is read from the input signal for use by the demultiplexer 36 and in instruction 96 the bit allocation is read. This bit allocation is transmitted in the form of the compression method to be used for each of the logical channels. Alternatively it is possible that the controller 38 uses the connection table it holds for determining the assignment of the compression types to the different channels. This can be done by using a copy of Table 3 in the same way as it is done in the controller 30.

In instruction 98 the new channel assignment is passed to the demultiplexer 36 and the decompression processor 40.

At a predetermined instant the demultiplexer 36 and the decompression processor switch to the new configuration. This can e.g. be after the next packet with the connection ID corresponding to the peer to peer connection between the controllers 30 and 38 is received. Finally the program is terminated in instruction 100.

What is claimed is:

1. Communication system comprising a first node having a multiplexer for multiplexing a plurality of source signals into a multiplex signal, the first node comprises transmission means for transmitting the multiplex signal to a second node, the second node comprises a demultiplexer for demultiplexing the multiplex signal into said source signals, characterized in that the multiplexer is arranged for introducing a variable length auxiliary signal into the multiplex signal, the length of the variable length auxiliary signal being dependent on an aggregate rate of the source signals to be transmitted, wherein the multiplexer is arranged for multiplexing the source signals into packets, and for introducing the auxiliary signal into said packets, and in that the demultiplexer is arranged for extracting said packets from the multiplex signal, and for extracting said auxiliary signal from said packets.

2. Communication system according to claim 1, wherein the auxiliary signal comprises a predetermines symbol sequence.

3. Communication system according to claim 1 or 2, wherein the length of the variable length auxiliary signal can also assume the value of zero.

4. Communication system according to claim 3, wherein the multiplexer is arranged for introducing a length field into the packet indicating the length of a source signal field in the packet, and in that the demultiplexer is arranged for extracting the source signal field using the length carried by the length field.

5. Communication system according to claim 4, wherein the length field can alternatively comprise a first number of symbols indicating a fixed length of the source signal field or a second number of symbols larger than the first number carrying a length value indicating the length of a variable length of the source field.

6. Communication system according to claim 5, wherein the first number equals to one.

7. Transmitter node having a multiplexer for multiplexing a plurality of source signals into a multiplex signal, the node comprises transmission means for transmitting the multiplex signal, wherein the multiplexer is arranged for introducing a variable length auxiliary signal into the multiplex signal, the length of the variable length auxiliary signal being dependent on an aggregate rate of the source signals to be transmitted, wherein the multiplexer is arranged for multiplexing the source signals into packets, and for introducing the auxiliary signal into said packets, and for use with a demultiplexer that is arranged for extracting said packets from the multiplex signal, and for extracting said auxiliary signal from said packets.

8. Receiver node comprising a demultiplexer for demultiplexing a multiplexing signal into a plurality of source signals, wherein the demultiplexer is further arranged for extracting from the multiplex signal a variable length auxiliary signal, the length of the variable length auxiliary signal being dependent on an aggregate rate of the source signals in the multiplex signal, wherein the demultiplexer that is arranged for extracting packets from the multiplex signal, and for extracting said auxiliary signal from said packets, and for use with a multiplexer that is arranged for multiplexing the source signals into packets, and for introducing the auxiliary signal into said packets.

9. Transmission method comprising multiplexing a plurality of source signals into a multiplex signal, transmitting the multiplex signal to a second node, the method further comprises demultiplexing the multiplex signal into said source signals, wherein the method comprises introducing a variable length auxiliary signal into the multiplex signal, the length of the variable length auxiliary signal being dependent on an aggregate rate of the source signals to be transmitted, wherein the multiplexer is arranged for multiplexing the source signals into packets, and for introducing the auxiliary signal into said packets, and in that the demultiplexer is arranged for extracting said packets from the multiplex signal, and for extracting said auxiliary signal from said packets.

10. Multiplex signal carrying a plurality of source signals wherein the method comprises introducing a variable length auxiliary signal into the multiplex signal, the length of the variable length auxiliary signal being dependent on an aggregate rate of the source signals, wherein the source signals and the auxiliary signal are arranged into packets, and in that the source signals and auxiliary signal can be extracted from said packets.

11. Multiplex signal according to claim 10, wherein the length of the variable length auxiliary signal can also assume the value of zero.

* * * * *